United States Patent
Long

[11] Patent Number: 5,876,856
[45] Date of Patent: Mar. 2, 1999

[54] ARTICLE HAVING A HIGH-TEMPERATURE THERMAL CONTROL COATING

[75] Inventor: Lynn E. Long, Manhattan Beach, Calif.

[73] Assignee: Hughes Electronics Corporation, Los Angeles, Calif.

[21] Appl. No.: 994,342

[22] Filed: Dec. 19, 1997

Related U.S. Application Data

[60] Continuation-in-part of Ser. No. 717,443, Sep. 20, 1996, Pat. No. 5,770,269, which is a division of Ser. No. 242,201, May 13, 1994, Pat. No. 5,589,274.

[51] Int. Cl.$^6$ .............................. B05D 5/06; B05D 5/12; B32B 33/00; B32B 18/00
[52] U.S. Cl. .................... 428/446; 427/192; 427/193; 427/195; 427/226; 427/376.2; 427/387; 428/404; 428/405; 428/688; 428/689; 428/697; 428/334
[58] Field of Search ................ 427/387, 376.2, 427/375, 195, 226, 193, 192, 126.1; 428/213, 216, 334, 339, 404, 405, 446, 688, 689, 697, 429

[56] References Cited

U.S. PATENT DOCUMENTS

| | | | |
|---|---|---|---|
| 3,965,096 | 6/1976 | Reinisch et al. ................ | 20/240 G |
| 4,039,347 | 8/1977 | Fletcher et al. ................ | 106/292 |
| 4,317,855 | 3/1982 | Guillaumon et al. ............ | 428/212 |
| 4,476,155 | 10/1984 | Niemi ............................ | 427/58 |
| 4,939,031 | 7/1990 | Torre et al. .................... | 428/323 |
| 5,064,574 | 11/1991 | Oldham et al. ................. | 252/518 |
| 5,094,693 | 3/1992 | Cordaro et al. ................ | 106/425 |
| 5,215,824 | 6/1993 | Munro, III et al. ............. | 428/473.5 |
| 5,306,522 | 4/1994 | Clough et al. .................. | 427/376.2 |
| 5,312,685 | 5/1994 | Banks et al. ................... | 428/336 |
| 5,338,799 | 8/1994 | Ohsugi et al. .................. | 427/387 |
| 5,384,190 | 1/1995 | Kaburaki ........................ | 428/323 |
| 5,401,573 | 3/1995 | Babel et al. .................... | 428/336 |
| 5,441,726 | 8/1995 | Mitchnick et al. .............. | 424/59 |
| 5,545,683 | 8/1996 | Okamura et al. ............... | 106/10 |
| 5,612,399 | 3/1997 | Beckley et al. ................. | 524/261 |
| 5,747,100 | 5/1998 | Petersen ......................... | 427/404 |
| 5,770,269 | 6/1998 | Long et al. ..................... | 427/387 |
| 5,798,060 | 8/1998 | Brevett .......................... | 252/520.1 |
| 5,804,306 | 9/1998 | Sorensen et al. ............... | 428/297.4 |
| 5,807,909 | 9/1998 | Cordaro et al. ................ | 523/179 |

FOREIGN PATENT DOCUMENTS 0558044  2/1992  European Pat. Off. .

OTHER PUBLICATIONS

Anon., Technical Data Sheet RS 103 on "White Antistatic Paint SGC21", Feb. 1991.
Cheng Hsieh et al., "Conductive White Thermal Control Paint for Spacecraft," Proc. 38th International SAMPE Symposium, pp. 609–622, May 10–13 1993.
J. Cordaro et al., "Molecular Engineering of Pigments for Degradation–Resistant Thermal Control Coatings", AIAA Reprint AIAA–92–2167 of Presentation of AIAA Materials Specialist Conference on Coating Technology for Aerospace Systems, pp. 85–87, Apr. 16–17, 1992.
Derwent Publication (Database WPI); AN 84–065980; JP–A–59022054 (Ricoh); 2 Feb. 1984; Abstract.
Derwent Publication (Database WPI); AN 88–224490; JP–A–63159865 (Ricoh); 2 Jul. 1988; Abstract.

*Primary Examiner*—Diana Dudash
*Attorney, Agent, or Firm*—Terje Gudmestad; Georgann S. Grunebach; Michael W. Sales

[57] ABSTRACT

An article such as a spacecraft thermal radiator includes a substrate having a white thermal control coating thereon. The thermal control coating is formed of a matrix of a silica/silicate transformation product of a ceramic precursor, and a plurality of doped zinc oxide pigment particles distributed in the matrix. The zinc oxide pigment particles are doped with an element that forms shallow donorlike states in the zinc oxide. The coating has a solar absorptance of from about 0.2 to about 0.3 and an initial electrical resistivity of from about $1 \times 10^6$ ohms per square to about $1 \times 10^8$ ohms per square. The coating is stable at continuous operating temperatures of 225° C., with short-term exposures of up to 800° C.

20 Claims, 2 Drawing Sheets

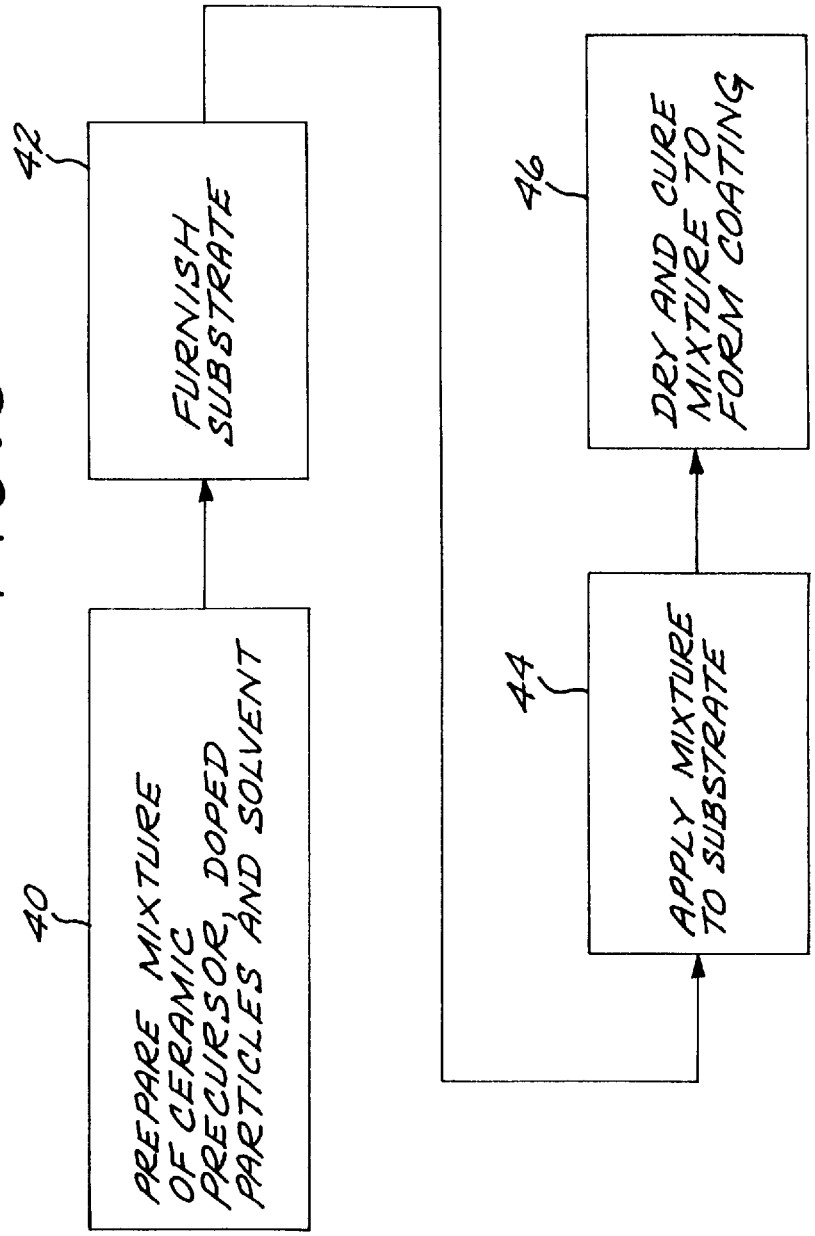

ARTICLE HAVING A HIGH-TEMPERATURE THERMAL CONTROL COATING

This application is a continuation-in-part of application Ser. No. 08/717,443, filed Sept. 20, 1996, now U.S. Pat. No. 5,770,269 for which priority is claimed; which is a division of application Ser. No. 08/242,201, filed May 13, 1994, now U.S. Pat. No. 5,589,274, for which priority is claimed.

BACKGROUND OF THE INVENTION

This invention relates to coated articles and their use, and, more particularly, to a white coating that aids in controlling the surface temperature of the article to which it is applied, is sufficiently electrically conductive to dissipate static charge, and is stable at elevated temperatures.

Spacecraft such as satellites and deep-space craft are exposed to a wide range of thermal conditions. A side facing the sun is heated by the direct thermal radiation, while a side facing the void of space is cooled rapidly by radiation. Thermal control of the spacecraft is therefore important. Various techniques have been developed to maintain the interior of the spacecraft at a temperature suitable for occupancy by human beings and sensitive equipment.

In one thermal control approach, the external surface of the spacecraft is covered with a white coating that has a low solar absorptance and a high infrared emittance. The coating on the spacecraft substrate aids in maintaining thermal control. It must also be stable to the radiation and low-pressure gaseous environment encountered in space without losing its thermal properties by discoloring or otherwise and must be resistant to mechanical damage by micrometeorite impacts. For most applications, the coating must also be sufficiently electrically conductive to dissipate electrostatic charge that otherwise builds up on the surface of the spacecraft.

In at least some of the spacecraft applications, the coating material must be stable at elevated temperatures experienced by the surface of the substrate to which it is applied. For example, the spacecraft may include thermal radiators that receive heat generated from electronic devices or other power sources within the spacecraft and radiate that heat to the exterior. The surface of the thermal radiator is heated by the heat conducted to it to a temperature of about 225° C. or higher, sometimes for short periods to a temperature as high as 800° C., in the case of an advanced communications satellite in geosynchronous orbit. If the temperature of the thermal radiator is to be controlled by the application of a thermal control paint, the paint must be stable at the surface operating temperature of the thermal radiator as well as meet the other requirements discussed above.

Ceramic-based thermal control coatings are currently available to meet these requirements. In one known type of coating, aluminum-doped zinc oxide particles are dispersed in a potassium silicate ceramic matrix that is applied to the surfaces of the spacecraft. This coating, while operable in some situations, tends to be brittle and subject to fracture during curing and handling.

Other types of coatings are available, but they are generally not suitable for use on substrates that reach elevated surface temperatures. In one such approach, a two-part coating system is applied to the spacecraft surface. The base coat consists of metallic flakes in a silicone binder to provide electrical charge dissipation. The top coat includes zinc orthostannate pigment in a silicon binder to produce low solar absorptance and high infrared emittance. This two-part coating is also usable in some applications, but is not stable at elevated surface temperatures in excess of 250° C. experienced by spacecraft thermal radiators, is difficult to use, and produces inconsistent results because of its complexity.

There is a need for a coating for use on spacecraft and in other thermal-control applications. Such a coating should exhibit acceptable thermal and electrical properties, be stable at elevated surface temperatures such as found on spacecraft radiators, and also be easy to use to produce consistent results. The present invention fulfills this need, and further provides related advantages.

SUMMARY OF THE INVENTION

This invention provides a white thermal control coating, somewhat similar in nature and use to a paint, and an article having the coated applied thereto. The thermal control coating has a low solar absorptance and a high infrared emittance, and is sufficiently electrically conductive to dissipate electrostatic charge that otherwise may accumulate on the surface. The coating is chemically and mechanically stable at elevated temperatures and may be used in continuous service at substrate surface temperatures as high as 225° C. with shorter periods at higher temperatures up to about 800° C. The coating may be used on substrates that experience a wide temperature variation during service. The coating is less brittle and has a greatly reduced tendency to spall, as compared with potassium silicate-based thermal control coatings that may be used at elevated temperatures and experience large temperature variations in service. The coating of the invention has much better impact and abrasion resistance than the prior potassium silicate-based coating. The coating is readily applied by spraying, brushing, dipping, or other techniques, to produce a uniform, consistent coating. It may be applied as a relatively thick coating layer, which aids in reaching the objective of a low surface absorptance.

In accordance with the invention, a coated article comprises a substrate having a surface, and a white coating on the surface of the substrate. The coating includes a ceramic matrix comprising a silica/silicate transformation product of a ceramic precursor, and a plurality of doped zinc oxide pigment particles distributed in the matrix. The zinc oxide pigment particles are doped with an element that forms shallow donorlike states in the zinc oxide. Preferably the coating has a solar absorptance of from about 0.2 to about 0.3 and a surface electrical resistivity of from about $1 \times 10^6$ ohms per square to about $1 \times 10^8$ ohms per square.

In one preferred version, the silicate transformation product comprises a network of bonded and interlocked microfibers, such as silica/silicate microfibers, produced in-situ from a ceramic precursor during the curing of the coating. The network of microfibers serves as a matrix into which the doped zinc oxide particles are distributed and retained. Optionally, oxide particles other than the doped zinc oxide particles are distributed in the matrix.

The substrate is preferably a metal or a metal-matrix composite material. The coating of the invention is stable at elevated temperatures. The preferred application is metallic articles that experience relatively high surface temperatures and wide temperature variations during service, such as some spacecraft thermal radiators. The coating may be applied to be relatively thick, in the range of from about 0.002 inches to about 0.005 inches, to aid in achieving a low thermal absorptance. The doped zinc oxide particles confer low absorptance and electrical conductivity to the coating.

The present coating provides an important advance in the art of thermal control coatings, particularly for use on spacecraft components such as thermal radiators. Excellent performance is attained in a white coating of low absorptance, high emittance, sufficient electrical conductivity, and good mechanical properties such as adherence, abrasion resistance, and impact resistance over a wide range of temperatures and extending to elevated temperatures. The excellent properties of the coating are retained over a temperature range of at least from about −195° C. to about +225° F. The coating is operable with a sustained substrate surface temperature of about 225° C., with brief excursions to temperatures as high as about 800° C. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is a block process flow diagram for the preparation and application of the coating of the invention.

DETAILED DESCRIPTION OF THE INVENTION

Figure 1:
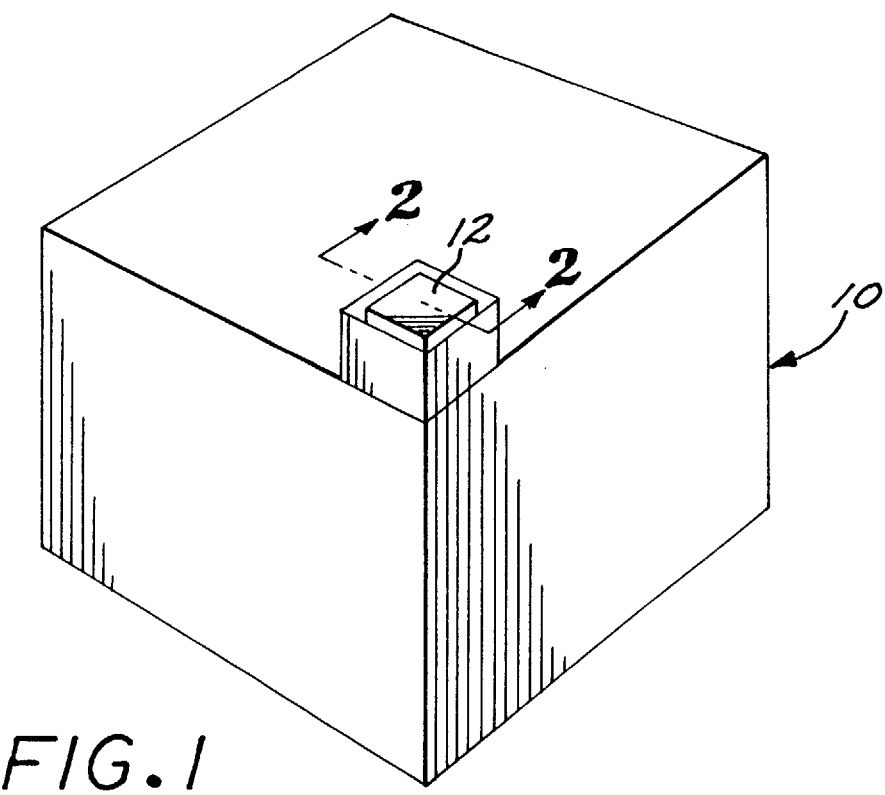
FIG. 1 is a spacecraft with a thermal radiator.

FIG. 1 depicts a spacecraft, in this case a communications satellite 10 designed to operate in geosynchronous earth orbit. Amplifiers and other electronic apparatus (not shown) inside the satellite 10 generate waste heat that is conveyed to one or more external thermal radiators 12 located on the exterior of the satellite. In the inventor's preferred application, the thermal radiator 12 is an external fin on a heat pipe that conducts heat from the interior of the spacecraft. The surfaces of the thermal radiators may be heated both by the heat conducted from the interior of the satellite and by radiant heating of the sun. The surfaces of the thermal radiators 12 may reach sustained service temperatures as high as about 225° C., with brief excursions to temperatures as high as about 800° C. The surfaces of the thermal radiators may also experience much lower temperatures, such as about −195° C., when facing away from the sun and exposed to the void of space and without the internal electronics powered to produce heat. The thermal radiator thus experiences both high temperatures and large temperature variations in service.

Figure 2:
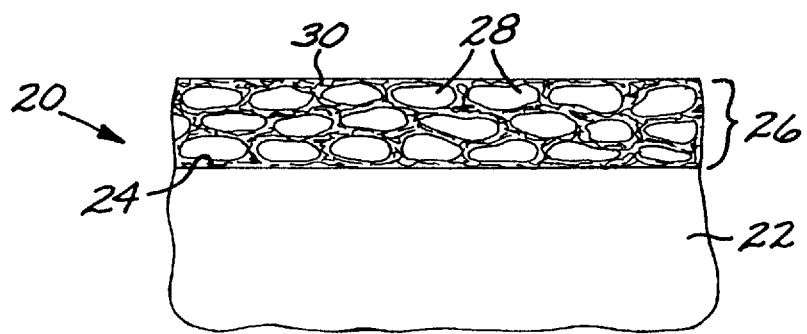
FIG. 2 is a sectional view of a portion of a thermal radiator substrate having a surface coated with the coating of the invention, taken on line 2—2 of FIG. 1.

FIG. 2 depicts in general form an article 20 including a substrate 22 having a surface 24. The surface 24 is covered with a layer of a coating 26 according to the invention. The article 20 may be made of any material that supports the coating 26, but is preferably a metal such as aluminum, titanium, or stainless steel. The article 20 is preferably the thermal radiator 12 having its outermost region defining the substrate 22 and its surface defining the surface 24. The invention is applicable more broadly, however. No limitation is known on the material of construction of the substrate 22.

The coating 26 is a mixture of doped zinc oxide particles 28 within a matrix 30 of silica/silicate reactively produced microfibers. (FIG. 2 is not drawn to scale. In FIG. 2, the sizes of the microfibers, which are preferably on the order of micrometers or less in diameter, are exaggerated so as to be visible.) The zinc oxide particles 28 have a white color. It is known that the doping of the particles with elements that form shallow donorlike states aids in retaining the white color following exposure to radiation in space and also imparts sufficient electrical conductivity to allow the coating to dissipate electrostatic charges that otherwise build up on the surface 24. See U.S. Pat. No. 5,094,693 and J. Cordaro et al., "Molecular Engineering of Pigments for Degradation-Resistant Thermal Control Coatings," AIAA Reprint AIAA-92-2167 of Presentation at AIAA Materials Specialist Conference on Coating Technology for Aerospace Systems, Apr. 16–17, 1992. Such electrostatic charges arise from a variety of sources in a spacecraft, and unless gradually dissipated can eventually build to a high voltage whose discharge can damage electronic devices within the spacecraft.

The preferred dopant for the zinc oxide particles is aluminum, but boron, gallium, indium, zinc, tin, and/or hydrogen may also be used. In the most preferred case, the zinc oxide has a particle size of from about 15 to about 25 micrometers, preferably at the lower end of this range, and is doped with from about 0.35 to about 1.0 weight percent aluminum. The small particle size aids in achieving a smooth consistency to the coating material in a solvent, before the coating is dried. The most preferred doped pigment material is available commercially from Union Miniere, Miniere, Belgium.

The matrix comprises a ceramic material produced by the in-situ chemical reaction of a ceramic precursor material, preferably a silicone precursor material, at the surface of the substrate. (The term "ceramic precursor material, as used herein, refers to a nonceramic material that chemically transforms to a ceramic in the proper conditions.) The matrix is preferably prepared by mixing the ceramic precursor with a solvent/carrier liquid. The ceramic precursor is preferably silicone microfibers and the solvent/carrier liquid is preferably toluene. The solvent/carrier liquid is present in an amount sufficient to permit application of the ceramic precursor material as a thin coating by a selected technique. For example, if the ceramic precursor material is to be applied by painting, less solvent/carrier liquid is used than if the ceramic precursor material is to be applied by spraying. Optionally, oxide particles (other than the doped zirconium oxide particles) such as silica, zirconia, or alumina may also be present in the mixture. A suitable ceramic precursor material is available commercially from Advanced Packaging & Product Company (formerly Sperex Co.) as product SP-115I.

Doped zinc oxide pigment particles are present in the mixture. The ratio of doped zinc oxide pigment preferably is about 0.75 parts by weight, per 1 part by weight of the ceramic precursor and solvent. After heating and curing, as will be described, the solvent evaporates, leaving the ratio of doped zinc oxide pigment to ceramic matrix transformation product on the order of about 3–4 parts of the zinc oxide pigment to 1 part of the ceramic matrix material. It is permissible to produce a coating outside these ranges, but the performance of such coatings is not as good as that of coatings within the range. If the ratio of pigment to ceramic matrix is less than about 3-to-1, the solar absorptance of the coating is greater than preferred. If the ratio of pigment to ceramic matrix is greater than about 4-to-1, there is insufficient matrix in the final product to bind the pigment together in a coherent coating. The result is a coating having reduced physical integrity, strength, and resistance to fracture.

FIG. 3 depicts a preferred process for preparing the coating material and applying the coating to the substrate. A mixture of the ceramic precursor, the doped zinc oxide particles, and a solvent such as toluene is prepared, numeral 40. In a preferred embodiment, about 300 parts by weight of the SP-151I ceramic precursor and about 231 parts by weight of the aluminum-doped zinc oxide pigment are combined to form a precursor mixture and placed into a ceramic jar with ½ inch diameter ceramic grinding media. The jar is closed and placed onto a ball mill. Ball milling is continued until the pigment is ground to a Hegman grind of at least 6, which typically requires about 4–5 hours. The ball mill grinding is continued until the desired grind size is reached. After ball mill grinding is complete, the precursor mixture is transferred to a glass or metal container.

The substrate 22 is supplied, numeral 42. The surface 24 of the substrate 22 is cleaned of dirt, grease, and other foreign matter by abrasion with a scotchbrite pad and wiping with methyl ethyl ketone solvent. No other special preparation of the surface, such as etching or the like, is required.

Application of the final mixture may be accomplished by any operable technique, such as, for example, spraying, painting, dipping, etc, Additional amounts of the solvent may be added to the mixture to adjust its viscosity according to the selected application technique. The above-described formulation of the final mixture is for the preferred application approach of spraying. To accomplish the spray application, any conventional air-atomizing sprayer and its conventional spray procedure are used.

With the formulation discussed above, the spraying produces a uniform coating on the surface 24. The coating can be relatively thick or thin. If a thick coating is desired, it is preferred to apply a succession of thinner coats over an area and to allow each thin coat to dry partially before applying the next coat. The present mixture formulation permits relatively thick coatings to be applied. These thick coatings tend to have a slightly lower solar absorptance than thinner coatings of the same material, as will be illustrated in greater detail subsequently. The applied, dried, and cured final coating preferably has a thickness of from about 0.002 inches to about 0.005 inches. If the coating is thinner than about 0.002 inches, its solar absorptance is too high. If the coating is thicker than about 0.005 inches, the coating tends to be too brittle for good cohesion, adhesion, and impact resistance.

The mixture applied to the surface is permitted to dry and cure, numeral 48. After the complete coating has been applied and dried to the touch to remove most of the solvent, it is preferred to cure the coating for 4 hours at 225° C.

In the curing process, any remaining solvent first evaporates. The organic ceramic precursor thereafter chemically transforms to a ceramic material by the evolution of carbon and oxygen from the precursor, leaving silica or a silicate. It is preferred that the ceramic precursor be in the form of microfibers, which bond and interlock together and to the substrate during the curing to form a microfiber matrix. As used herein, the term "silica/silicate" means that the microfibers may be silica microfibers, may be silicate microfibers, or may be a mixture thereof. The microfibers are chemically bonded to each other and to the substrate, and are additionally intertwined with each other to mechanically interlock them. The bonded and interlocked microfibers hold the doped zinc oxide particles in place, yet allow thermal strains and stresses to be accommodated harmlessly. The fibrous matrix deforms to relieve any thermal stresses that would otherwise be present, due to differential thermal expansion of the substrate and the coating, if the coating were an uninterrupted solid. The oxide particles, where present, and the doped zinc oxide particles are dispersed throughout this matrix array of bonded and interlocked microfibers.

This sequence for the formation of the coating and the resulting coating are quite distinct from other approaches wherein doped zinc oxide particles are dispersed in a potassium silicate matrix, as discussed, for example, in U.S. Pat. No. 5,094,693, and yields improved results as compared with the prior coatings. In the present approach, the ceramic precursor material is applied to the surface of the substrate, with the ceramic precursor in its organic form. The curing operation, conducted after the precursor material is applied to the surface, transforms the organic precursor material to the silica/silicate form. This in-situ transformation aids in bonding the reaction product both to itself and to the substrate. In conventional potassium silicate/zinc oxide coatings, the silicate is applied to the substrate in the silicate form, not as a precursor that is reacted to produce the ceramic form. Consequently, there is no organic-to-ceramic transformation to bond the coating to itself and to the substrate.

This different approach results in significant improvements to the properties of the present coating as compared with the prior potassium silicate coatings, for example. The present coating, after curing, is highly adherent to the substrate and coherent within itself. It is not easily abraded from the substrate, and is resistant to impact damage. The conventional potassium silicate/zinc oxide coatings are far less adherent and coherent, and can often be easily rubbed away from the surface.

To test the coating of the invention, coating material was prepared according to the preferred approach and having the preferred composition. The mixture was applied by spraying to the substrate, followed by drying and curing, all as described earlier.

A number of tests of the coated articles were performed using standard procedures.

The measured solar absorptance of the coating on an aluminum substrate was 0.235 for an average coating thickness of 0.0046 inches, 0.241 for an average coating thickness of 0.0034 inches, 0.260 for an average coating thickness of 0.0025 inches, and 0.277 for an average coating thickness of 0.00265 inches. These low absorptances are acceptable and within the range of about 0.2–0.3 generally desired for space applications, particularly where the coating is made sufficiently thick. Where the coating is too thin, as less than about 0.002 inches thick, the substrate may show through the coating and the solar absorptance is adversely affected.

The infrared emittance of the coating on aluminum was in the range of 0.884–0.887 for all measured coating thicknesses. These high emittances are acceptable and within the range of from about 0.85 to about 0.90 generally desired for spacecraft applications.

The surface resistivity of the coating on aluminum was measured as about $1–2 \times 10^7$ ohms per square for all coating thicknesses in the range of from about 0.0025 inches to about 0.0046 inches. These resistivities are sufficiently low to permit dissipation of electrical charge by current flow through the coating.

Specimens of the coated aluminum substrate were exposed to a continuous temperature of 225° C. for 7 days in a vacuum of 10–15 microns pressure. After the exposure, the specimens were thermally shocked for 35 cycles, with each cycle between 225° C. and immersion in liquid nitrogen at −195° C. The coating remained adherent to the substrate. The surface resistivities after this environmental exposure sequence were in the range of $2 \times 10^6$ to $6 \times 10^7$ ohms per square.

The coatings of the invention thus provide excellent properties and uniformity of application for a thermal control, electrical charge dissipative coating useful for space applications at sustained surface temperatures of as high as 225° C., and which may sometimes reach about 800° C. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A coated article, comprising:
   a substrate having a surface; and
   a white coating on the surface of the substrate, the coating comprising
      a matrix comprising a silica/silicate transformation product of a ceramic precursor, and
      a plurality of doped zinc oxide pigment particles distributed in the matrix, the zinc oxide pigment particles being doped with an element that forms shallow donorlike states in the zinc oxide.

2. The coated article of claim 1, wherein the substrate is a spacecraft thermal radiator.

3. The coated article of claim 1, wherein the ceramic precursor comprises a silicone.

4. The coated article of claim 1, wherein the ceramic precursor comprises a microfiber.

5. The coated article of claim 1, wherein the silica/silicate transformation product comprises a mass of bonded and interlocked microfibers.

6. The coated article of claim 1, wherein the coating has a thickness of no less than about 0.002 inches.

7. The coated article of claim 1, wherein the coating has a thickness of from about 0.002 inches to about 0.005 inches.

8. The coated article of claim 1, wherein the zinc oxide is doped with an element from the group consisting of aluminum, gallium, indium, boron, zinc, tin, and hydrogen.

9. The coated article of claim 1, wherein the zinc oxide is doped with aluminum.

10. The coated article of claim 1, wherein the ratio of doped zinc oxide pigment particles:silica/silicate transformation product is from about 3:1 to about 4:1 parts by weight.

11. The coated article of claim 1, wherein the coating has a solar absorptance of from about 0.2 to about 0.3 and a surface electrical resistivity of from about $1 \times 10^6$ ohms per square to about $1 \times 10^8$ ohms per square.

12. A coated article, comprising:
   a substrate having a surface; and
   a white coating having a thickness of at least about 0.002 inches on the surface of the substrate, the coating comprising
      a matrix comprising a mass of bonded and interlocked silica/silicate microfibers formed as a transformation product of a silicone microfiber precursor, and
      a plurality of doped zinc oxide pigment particles distributed in the matrix, the zinc oxide pigment particles being doped with an element that forms shallow donorlike states in the zinc oxide.

13. The coated article of claim 12 wherein the coated article is a spacecraft thermal radiator.

14. The coated article of claim 12, wherein the coating has a thickness of from about 0.002 inches to about 0.005 inches.

15. The coated article of claim 12, wherein the ratio of doped zinc oxide pigment particles:silica/silicate microfibers is from about 3:1 to about 4:1 parts by weight.

16. A coated article, comprising:
   a substrate having a surface; and
   a white coating on the surface of the substrate, the coating comprising
      a matrix comprising a mass of bonded and interlocked microfibers, and
      a plurality of doped zinc oxide pigment particles distributed in the matrix, the zinc oxide pigment particles being doped with an element that forms shallow donorlike states in the zinc oxide.

17. A method for coating an article, comprising the steps of
   furnishing a substrate having a surface;
   furnishing a coating mixture comprising a ceramic precursor, a carrier, and a plurality of doped zinc oxide pigment particles, the zinc oxide pigment particles being doped with an element that forms shallow donorlike states in the zinc oxide
   applying the mixture to the surface of the substrate; and
   curing the mixture to evaporate the carrier and to transform the ceramic precursor to a silica/silicate transformation product, thereby forming a coating bonded to the surface of the substrate.

18. The method of claim 17, wherein the ceramic precursor comprises a silicone.

19. The method of claim 17, wherein the ceramic precursor comprises microfibers.

20. The method of claim 17, wherein the coating has a thickness of no less than about 0.002 inches.

* * * * *